United States Patent
Zimmerman

(10) Patent No.: US 7,693,757 B2
(45) Date of Patent: Apr. 6, 2010

(54) SYSTEM AND METHOD FOR PERFORMING INVENTORY USING A MOBILE INVENTORY ROBOT

(75) Inventor: Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 11/534,162

(22) Filed: Sep. 21, 2006

(65) Prior Publication Data
US 2008/0077511 A1   Mar. 27, 2008

(51) Int. Cl.
*G06Q 10/00* (2006.01)

(52) U.S. Cl. .................... 705/28; 235/462

(58) Field of Classification Search .............. None
See application file for complete search history.

(56) References Cited

U.S. PATENT DOCUMENTS

| | | | |
|---|---|---|---|
| 5,141,128 A * | 8/1992 | Pippin | 221/84 |
| 6,868,525 B1 | 3/2005 | Szabo | |
| 2002/0165790 A1* | 11/2002 | Bancroft et al. | 705/26 |
| 2003/0154141 A1* | 8/2003 | Capazario et al. | 705/27 |
| 2007/0199108 A1* | 8/2007 | Angle et al. | 901/17 |
| 2008/0065268 A1* | 3/2008 | Wang et al. | 700/245 |
| 2008/0306787 A1* | 12/2008 | Hamilton et al. | 705/7 |

OTHER PUBLICATIONS

"ScriptPro(R) Technology Evaluation Guide," vol. I: Robotic Prescription Dispensing Systems, 2005.
"Pharmacy Automation Acute Care Patients," accessed on Sep. 14, 2006, at the following url: http://www.uihealthcare.com/pharmacy/RxAutomation.html.
T. Zimmerman, "Tracking Shopping Carts Using Mobile Cameras Viewing Ceiling-Mounted Retro-Reflective Bar Codes," 2006 ICVS '06. IEEE International Conference on Computer Vision Systems, Jan. 4-7, 2006 pp. 36-36.

* cited by examiner

*Primary Examiner*—Matthew S Gart
*Assistant Examiner*—R. Shay Glass
(74) *Attorney, Agent, or Firm*—Samuel Kassatly; Shimokaji & Associates, P.C.

(57) ABSTRACT

A mobile inventory robot system generates an inventory map of a store and a product database when a mobile inventory robot is manually navigated through the store to identify items on shelves, a location for each of the items on the shelves, and a barcode for each of the items. The system performs inventory of the items by navigating through the store via the inventory map, capturing a shelf image, decoding a product barcode from the captured shelf image, retrieving a product image for the decoded product barcode from the product database, segmenting the captured shelf image to detect an image of an item on the shelves, determining whether the detected image matches the retrieved image and, if not, setting an out-of-stock flag for an the item.

27 Claims, 12 Drawing Sheets

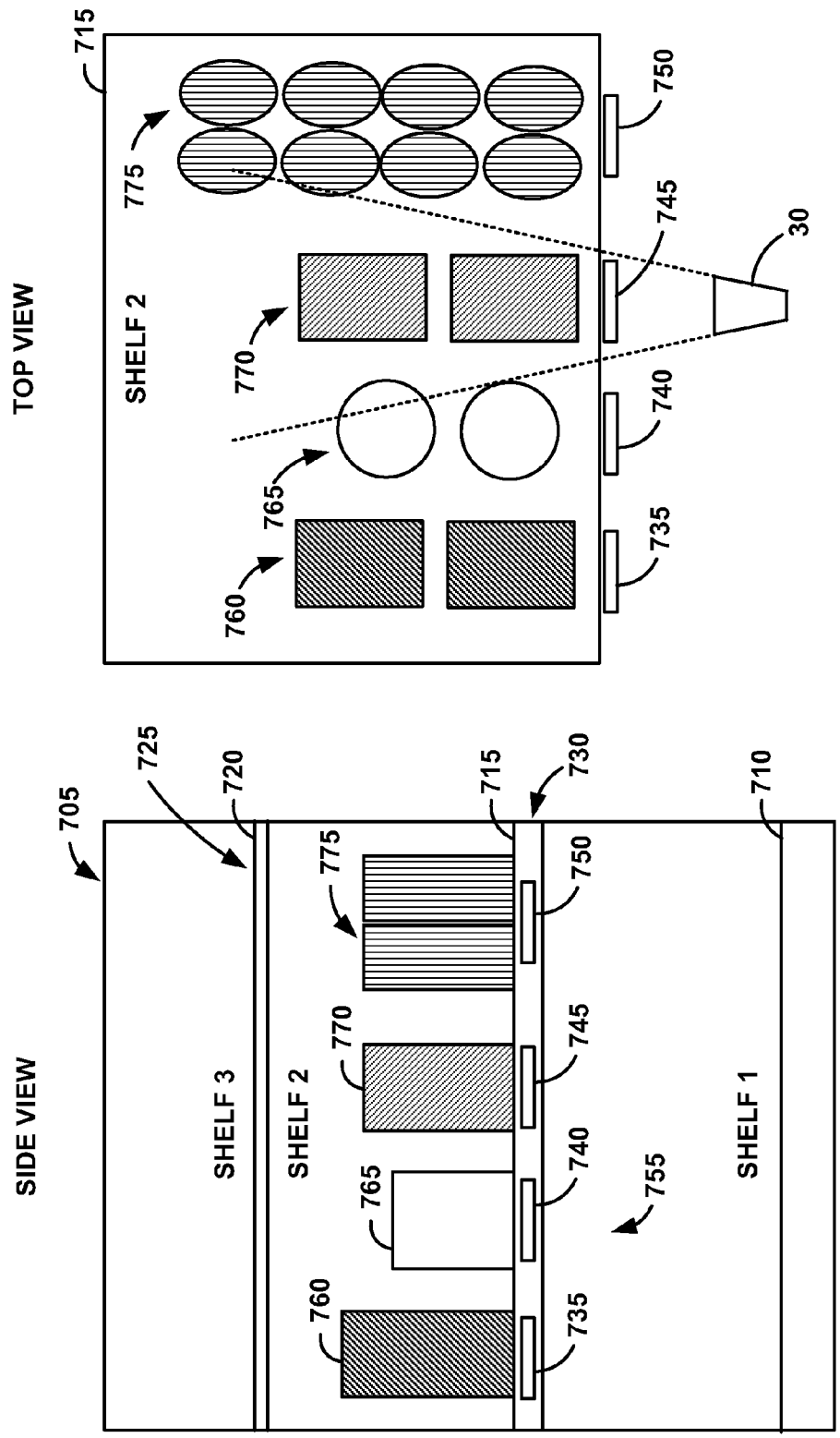

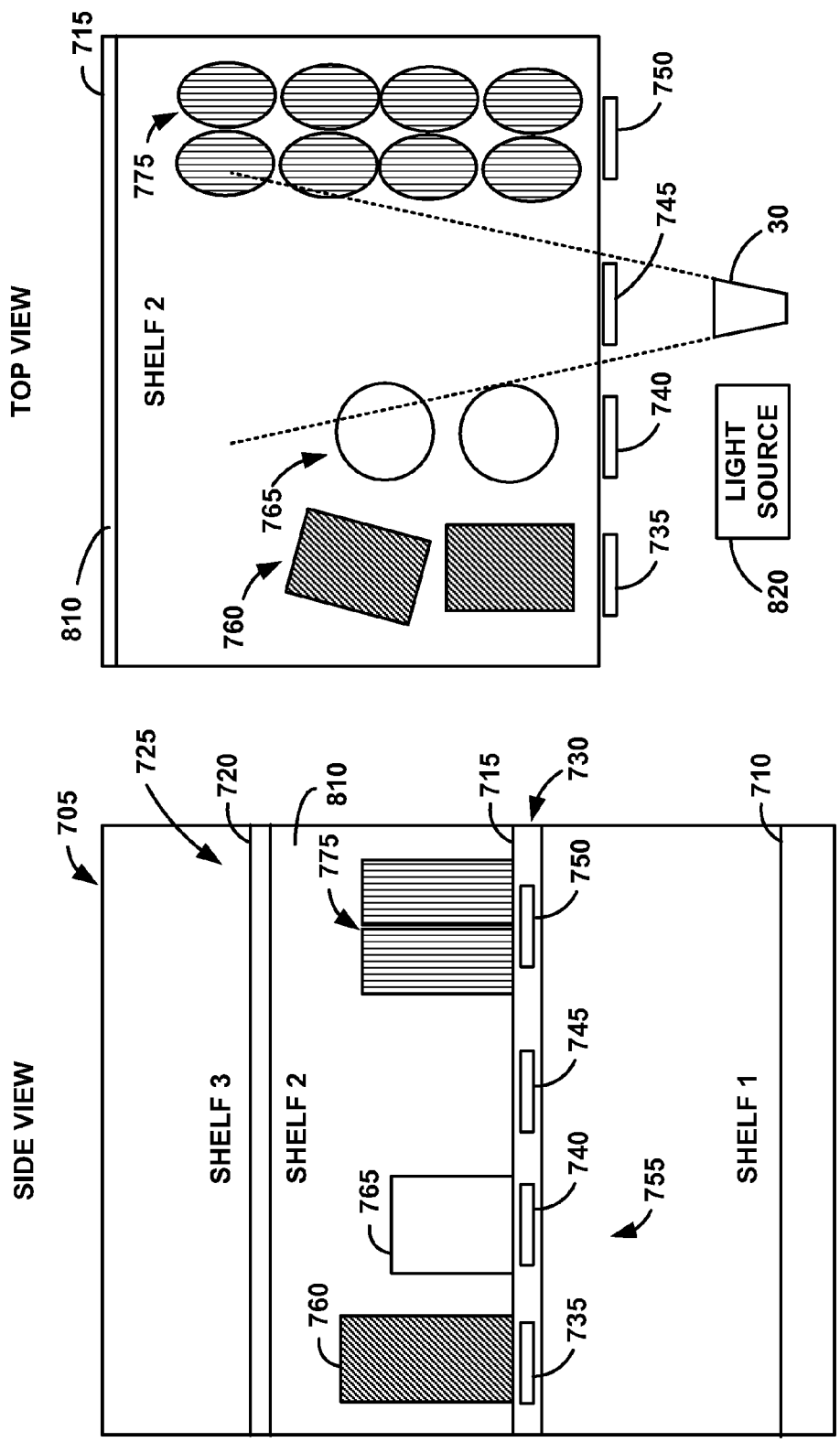

SYSTEM AND METHOD FOR PERFORMING INVENTORY USING A MOBILE INVENTORY ROBOT

CROSS-REFERENCE TO RELATED APPLICATION

The present application relates to co-pending U.S. patent application Ser. No. 11/325,952, filed on Jan. 5, 2006, and titled "Mobile Device Tracking", which is assigned to the same assignee as the present application, and which is incorporated herein by reference.

FIELD OF THE INVENTION

The present invention generally relates to inventory control, and in particular to an automatic method for checking inventory stock. More specifically, the present invention relates to performing inventory tasks using a robot.

BACKGROUND OF THE INVENTION

Inventory comprises maintaining a supply of items in an area for retrieval by customers. In a retail store, merchandise is placed or "stocked" on shelves, racks, and stands for display and retrieval by customers. Stocking shelves is an essential function of retail stores. An item not on a shelf cannot be sold. Consumer packaged good companies (referenced herein as a company or companies) are particularly concerned when their product is not on the shelf. The company may lose the sale in addition to a customer if the consumer tries a competing brand and prefers the competing brand, threatening a loss of future sales from that consumer.

During a promotion, a company spends a great amount of money advertising a product. If the campaign is successful, a new customer will purchase the advertised product, try the product, and become a loyal customer of the product and the company. If the promoted product is not on the shelves, those advertising dollars are wasted.

The condition of an item missing from the shelf is called out-of-shelf. The out-of-shelf item may be in a back room and simply needs to be stocked on the shelf. If the out-of-shelf item is not in the store, the item is requested from a distribution center or replenished from the manufacturer. An item may be located at several locations in the store, so an item that is out-of-shelf in one location may be redistributed from other locations in the store.

Typically a store employee is assigned the task of inventorying product on the shelf and replenishing an out-of-shelf product, an action called "facing the shelves". In a large store comprising, for example, 50,000 square feet with thousands of items, many employees are required to check for out-of-shelf items and replenish the shelves. This labor-intensive task is expensive and, if not performed frequently (i.e., nightly), can result in losses of sales and customers to the store and companies providing products.

Store managers and product manufactures are also concerned with the appearance of merchandise on shelves (are they in their proper place, label facing outward for desired appearance to the shopper). The condition of shelves and products on the shelves reflects an image of the retail store to the customer; store managers and product manufacturers wish to maintain a high-quality image to customers. Continual review of merchandise on shelves is required to maintain this appearance.

The location of items placed on shelves is also of concern to retailers and companies. Some manufactures pay for specific product placement, e.g. eye level. Firms may be hired to examine (audit) product placement, to verify that a retail store is in compliance with placement agreements. For a large chain of stores, the corporate office wishes to verify that regional stores are in good shape; the aisles are clear of obstructions that may cause injury, and that the appearance of merchandise meets company standards. The corporate office relies either on the assessment of the store manager or a first-hand impression of the state of the store by an employee of the corporate office. Monitoring regional stores can be expensive if there are hundreds of stores in geographically diverse locations.

The appearance of the shelves is also important to the store manager, who may not have the time to walk all the aisles. Misplaced items and shelves in disarray detract from the impression the store leaves on the customer, potentially losing sales and customers.

Warehouse stores often use very tall shelves (e.g. 18 feet) and store inventory on the top of shelves, too high to be viewed from the ground. To physically check stock, the employee is required to use mobile stairs or a forklift device. Locating stock in such locations for inventory purposes or to locate an item for a customer is time consuming and potentially dangerous.

Conventional methods for checking shelf inventory, while essential for maintaining product availability for purchase, are labor intensive, expensive and time consuming. Typically, a store employee views each shelf in the retail store, noting which products are running low or are out of stock. The employee may use a wireless-networked barcode reader to flag products that are low or out of stock. Once flagged, the products are retrieved from warehouse stock or ordered from the corresponding company.

One conventional approach uses radio frequency identification (RFID). The RFID system utilizes a "smart shelf", a shelf with RFID embedded antennas that interrogate the presence of items by wirelessly reading unique RFID tags applied to each item on the shelf. Although RFID technology has proven to be useful, it would be desirable to present alternate approaches to detecting out-of-stock conditions and performing inventory tasks in retail stores.

Each product on a shelf receives an RFID tag that can be tracked by an RFID system. The RFID system addresses the "last dozen feet" problem of supply chain management, from the backroom to the cash register, monitoring item-level tracking down to the shelf. However, RFID is currently expensive to implement for low cost items in a retail store. Currently, RFID tags cost about $0.25 per tag. When placed on a $2.00 item such as a tube of toothpaste, the cost of an RFID tag when compared to the cost of the item is substantial. RFID readers contribute additional overhead cost for each item in the store. Consequently, an RFID system is not an economically practical solution for item level tagging of low cost items primarily due to the expense of the RFID tag that is thrown away with each item.

Considering the thousands of items in a store and the tremendous square footage of shelves in a large store (50 k to 250 k square feet), tagging items and adding instrumentation to shelves is an expensive proposition. What is therefore needed is a system and method for performing inventory using a mobile inventory robot, wherein the mobile inventory robot is an autonomous or semi-autonomous robot that can travel the store floor and image the shelves with cameras to detect out-of-stock items and report on the appearance and placement of products on the shelves. The need for such a solution has heretofore remained unsatisfied.

SUMMARY OF THE INVENTION

The present invention satisfies this need, and presents a system and an associated method (collectively referred to herein as "the system" or "the present system") for performing inventory using a mobile inventory robot. The present system generates an inventory map of a store when the mobile inventory robot is manually navigated through the store to identify items on shelves, establishes a location for each of the items on the shelves, reads and associates a barcode for each of the items. The present system generates a product database comprising the items, the location of each of the items, and the barcode for each of the items.

The present system performs inventory of the items by navigating through the store via the inventory map, capturing a shelf image, decoding a product barcode from the captured shelf image, retrieving a product visual descriptor for the decoded product barcode from a product database, segmenting the captured shelf image to detect an image of one of the items on the shelves, determining whether the detected image matches the retrieved product visual descriptor and, if not, setting an out-of-stock flag for an item corresponding to the decoded product barcode, thus performing an inventory of the items on the shelves of the store.

Generating the inventory map comprises locating tracking tags and waypoints. The tracking tags are attached to a fixed structure in the store, such as ceiling tiles, beams, pillars and shelves, to assist the mobile inventory robot in determine a location of the mobile inventory robot. In one embodiment, the tracking tags comprise retro-reflective material. The tracking tags are identified using a tracking imaging device. The tracking imaging device is a digital camera with approximately 640 by 480 VGA resolution and approximately a 10 Hz frame rate. In one embodiment, the waypoints comprise one or more infrared transmitters located in the store environment and an infrared receiver located on the inventory robot.

Generating the product database comprises capturing the shelf image for a plurality of shelves and processing the shelf image to detect the product barcode, the location for a product, an image of the product, and to generate a visual descriptor of the product.

Navigating through the store comprises performing obstruction avoidance using ultrasonic devices.

Capturing a shelf image is performed by an imaging device. The imaging device is a digital camera with approximately 3 Megapixels and approximately 1 Hz frame rate.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 7 is comprised of FIGS. 7A and 7B and represents a diagram of an exemplary shelf in a retail store or warehouse that is imaged and inventoried by the mobile inventory robot system of FIGS. 1 and 2 in which no out-of-shelf items are detected in the shelf;

FIG. 8 is comprised of FIGS. 8A and 8B and represents a diagram of an exemplary shelf in a retail store or warehouse that is imaged and inventoried by the mobile inventory robot system of FIGS. 1 and 2 in which an out-of-shelf item is detected in the shelf;

DETAILED DESCRIPTION OF PREFERRED EMBODIMENTS

The following definitions and explanations provide background information pertaining to the technical field of the present invention, and are intended to facilitate the understanding of the present invention without limiting its scope:

Cycle Count: a count of stock in a warehouse or retail store that is used to keep the "available for sale" stock balance accurate. An effective cycle counting system comprises taking a physical inventory of a portion of the stock in the warehouse or retail store each evening. The quantity of each item physically located within the warehouse or on a shelf of the retail store should correspond to on-hand stock stored in the system less the committed stock. Any discrepancies are recorded and adjusted.

Out of Stock: Not having inventory of an item in a warehouse or retail store.

Overage: Excess between the inventory determined from the perpetual inventory records and the amount of inventory actually on hand.

Overstock: Having a higher quantity of an item than can be sold within a reasonable amount of time.

Physical Count: a physical count is an annual, periodic, cyclical, or emergency count of stock in a retail store or warehouse to verify records, determine financial value, or help determine a cause of suspected inventory problems. Auditors typically require a full warehouse or full company physical inventory at fiscal year-end.

Re-Order Point: The mathematically ideal point at which an item is re-ordered to minimize holding or inventory costs while preventing the item from becoming out of stock.

Shrinkage: A shortage between the inventory determined from the perpetual inventory records and the amount of inventory actually on hand. Causes of shrinkage include employee theft, customer theft, vendor theft, damage, breakage, spoilage, accounting and recording errors, errors in marking retail prices, cash register errors, markdowns taken and not recorded, errors in accounting for customer returns, and errors in accounting for vendor receipts and returns. Typical shrinkage is 1% to 3% of all inventories.

Figure 1:
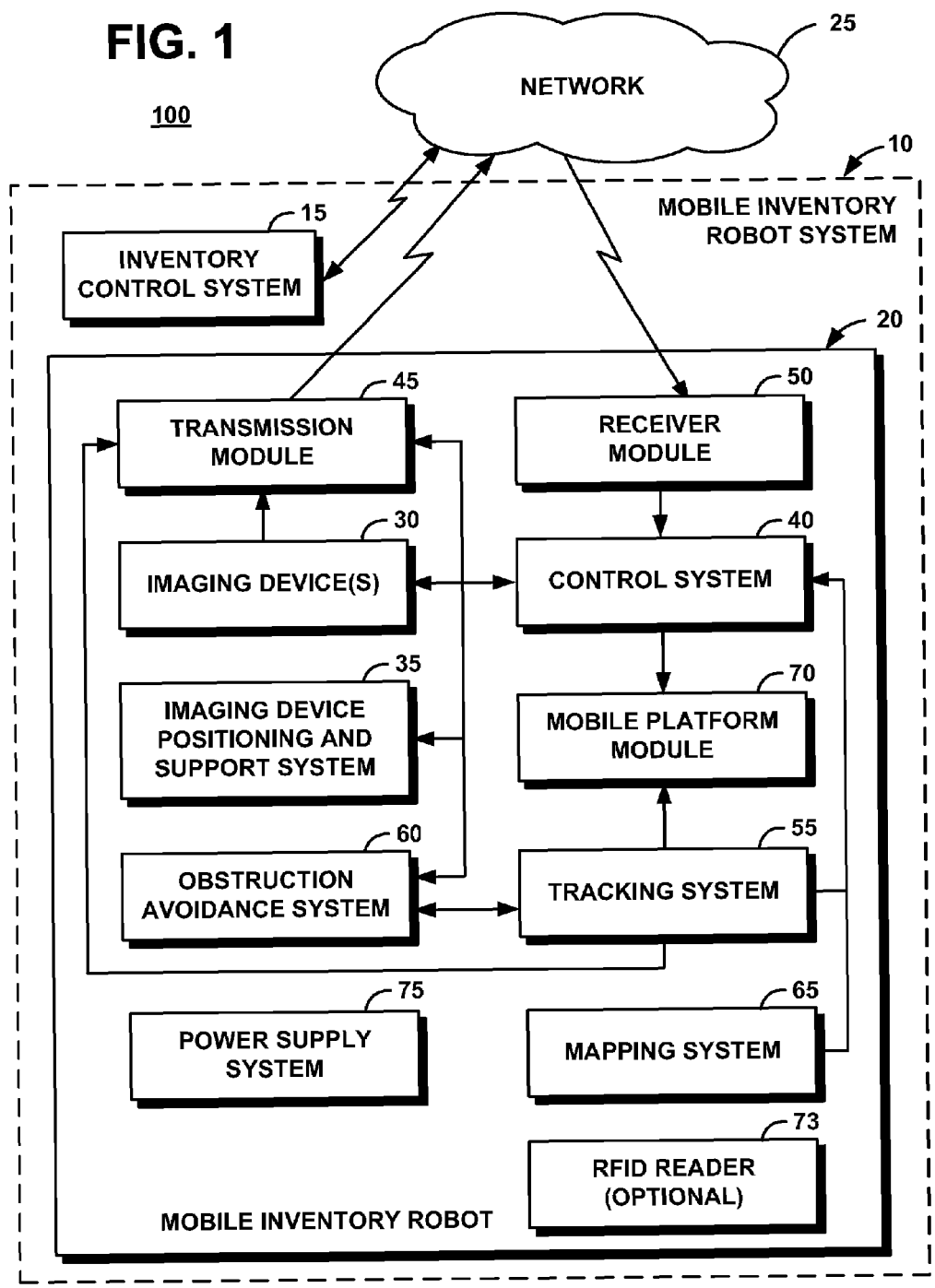
FIG. 1 is a schematic illustration of an exemplary operating environment in which a mobile inventory robot system of the present invention can be used.

FIG. 1 illustrates an exemplary inventory system 100 in which a mobile inventory robot system 10 (the system 10) may be used. System 10 comprises an inventory control system 15 and a mobile inventory robot 20. The inventory control system 15 and the mobile inventory robot 20 communicate via a network 25. Network 25 may comprise, for example, a local area network, a wide area network, the Internet, etc. The inventory control system 15 may be located within the same building as the mobile inventory robot 20, in a remote location such as a regional or corporate headquarters, or at any other location such as a support location operated overseas.

System 10 can take the form of an entirely hardware embodiment or an embodiment containing both hardware and software elements. In one embodiment, the inventory control system 15 is implemented in software, which includes but is not limited to firmware, resident software, microcode, etc.

Furthermore, the inventory control system 15 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk—read only memory (CD-ROM), compact disk—read/write (CD-R/W) and DVD.

A data processing system suitable for storing and/or executing program code comprises at least one processor coupled directly or indirectly to memory elements through a system bus. The memory elements can comprise local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The mobile inventory robot 20 comprises one or more imaging device(s) 30. The imaging devices 30 comprise a digital camera for imaging shelves in a store, barcode labels on the shelves, items on shelves and bar codes on the items.

The imaging devices 30 further comprise an optional light source for illuminating items on the shelves to further enhance the imaging capability of the imaging devices 30. In one embodiment, the imaging device 30 comprises a high-resolution, low frame-rate digital camera such as, for example, a digital camera with specifications of approximately 3 Megapixels and approximately 1 Hz frame rate with automatic focus and exposure, and remote controllable zoom lens, to provide sufficient image resolution for reading bar codes on shelf labels and on products, as well as capturing multiple items on shelves.

The mobile inventory robot 20 comprises an imaging device positioning and support system 35. The imaging devices 30 are attached to the imaging device positioning and support system 35. In one embodiment, the imaging device positioning and support system 35 is fixed in height and the imaging devices 30 are positioned to correspond to heights of shelves viewed by the mobile inventory robot 20. In another embodiment, the imaging device positioning and support system is adjustable in height such that the imaging devices 30 are moved vertically to view items in shelves, such as in a warehouse store or backroom with shelves that may rise in excess of 18 feet.

The mobile inventory robot 40 further comprises a control system 40, a transmission module 45, a receiver module 50, a tracking system 55, an obstruction avoidance system 60, a mapping system 65, a mobile platform module 70, an RFID reader 73, and a power supply system 75. The power supply system 75 comprises a rechargeable battery that provides power to the mobile inventory robot 20, and is recharged by docking the inventory robot with a stationary power docking station (not shown).

The transmission module 45 transmits images of shelves to the inventory control system 15. In one embodiment, the transmission module 45 transmits additional information about items on shelves generated by processing performed by the control system 40. Such additional information comprises, for example, barcodes determined from images, out-of-shelf items determined from images, items that are out of place (e.g., not above their shelf bar code). The receiver module 50 receives information and instructions from the inventory control system 15 for use by the control system 40 in, for example, positioning the imaging devices 30, controlling movement of the mobile inventory robot 20, and performing other functions. In another embodiment the RFID reader 73 is used to read RFID tags on pallets and containers in backrooms to provide an inventory of received and stored items. RFID tags may also be used as waypoints for navigation.

The control system 40 controls movement of the mobile inventory robot 20 and any image pre-processing performed on images captured by the imaging devices 30. The control system 40 moves the mobile inventory robot 20 along an inventory map stored in the mapping system 65 using feedback provided by the tracking system 55. The tracking system 55 tracks the position of the mobile inventory robot 20 within a building such as a retail store using feedback from tracking tags such as retro-reflective tags on the ceiling of the building and infrared waypoints placed in the floor of the building. The control system 40 further controls movement of the mobile inventory robot 20 using the obstruction avoidance system 60 that detects obstructions in the path of the mobile inventory robot 20, including people, shopping carts, boxes of items to be stacked on shelves, and floor displays.

The inventory map stored in the mapping system 65 further comprises an inventory plan that defines an order in which shelves and items in shelves are imaged. As the mobile inventory robot 20 traverses the inventory map, images of shelves, barcodes on shelves, items on shelves and bar codes on items are captured in a predetermined order; this predetermined order is the inventory plan.

Figure 2:
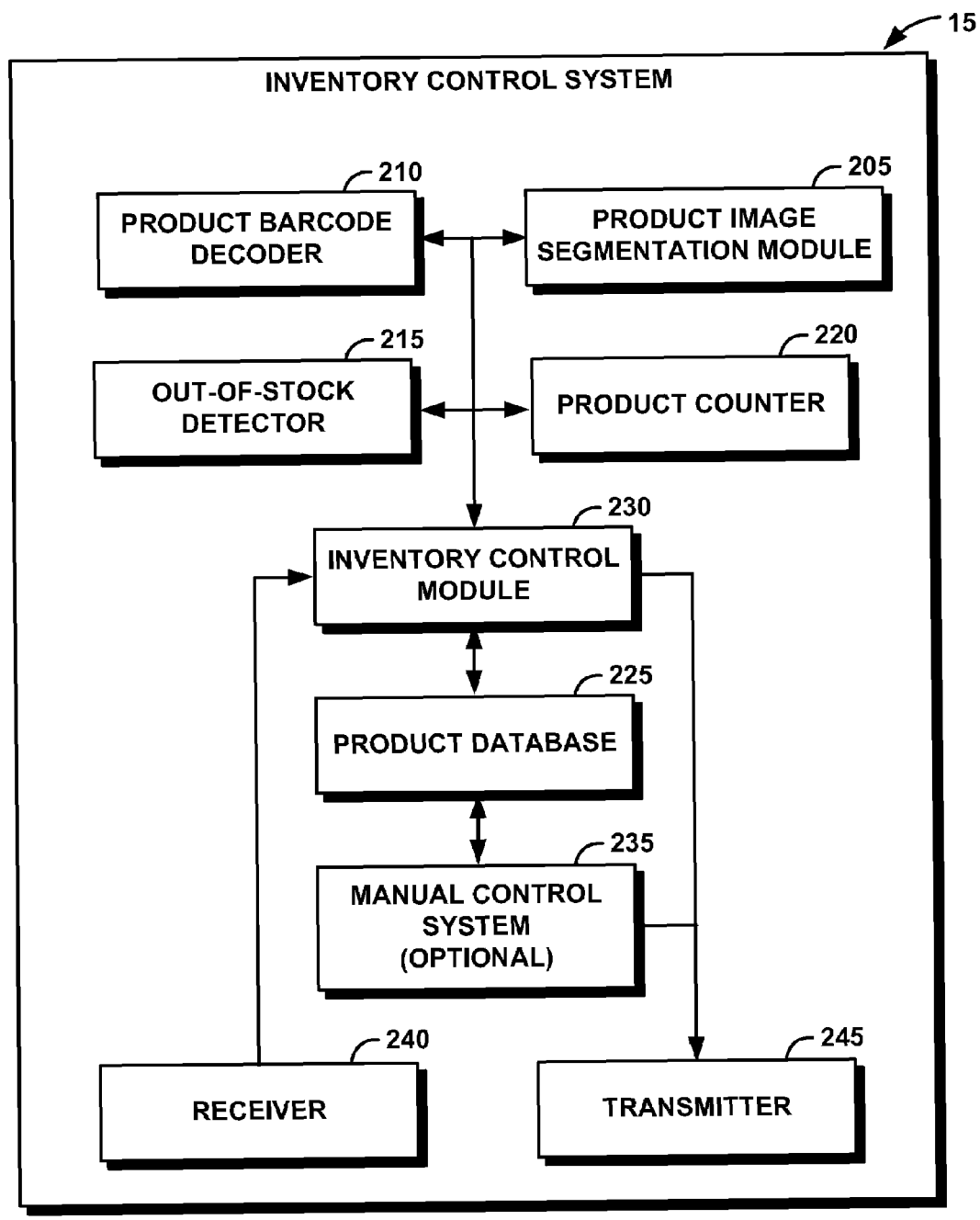
FIG. 2 is a block diagram of the high-level architecture of an inventory control system of the mobile inventory robot system of FIG. 1.

FIG. 2 illustrates a high-level hierarchy of the inventory control system 15. The inventory control system 15 comprises a product image segmentation module 205, a product barcode decoder 210, an out-of-stock detector 215, a product counter 220, a product database 225, an inventory control module 230, and an optional manual control system 235. The inventory control system 15 further comprises a receiver 240 for receiving images and other information from the mobile inventory robot 20 and a transmitter 245 for transmitting instructions, commands and program code to the mobile inventory robot 20.

The product image segmentation module 205 segments an image captured by the imaging devices 30 to isolate images of individual products. The product barcode decoder 210 extracts barcodes from images of barcode tags placed on shelves below items and on bar codes on items (when visible to the imaging device). The extracted shelf barcode indicates which item is expected to be in the shelf above the barcode. The extracted item barcode identifies the item. In one embodiment, the inventory control system 15 uses the image of an item corresponding to the extracted barcode as the product visual descriptor (stored in the product database 225) and compares the image to the image of the item on the shelf to determine if the item on the shelf matches the extracted barcode. If not, a flag is generated indicating that the item on the shelf is located in the wrong spot.

The out-of-stock detector 215 detects when items are missing on a shelf. The out-of-stock detector 215 returns a 0 if one or more items are present on the shelf. The out-of-stock detector 215 returns a 1 if the item is missing from the shelf.

In one embodiment, shelves are backed by a material such as, for example, retro-reflective material that reflects light emanating from the imaging device 30. This reflected light captured in an image indicates that no items are on the imaged shelf at the location of the reflected light. The out-of-stock detector 215 detects the missing item, and generates a flag indicating that the expected item on the shelf is missing, along with the description and barcode of the missing item.

The product counter 220 counts the number of items on the shelf and determines whether the number of items present in the shelf is below an inventory threshold, requiring restocking of the shelf before the item is out of stock. The mobile inventory robot 20 is mobile, allowing capture of additional points of view of the same item to determine whether additional items are on the shelf. Additional imaging devices provide a vertical perspective of a shelf, allowing capture of a shelf image from above and enabling the control inventory system to determine a sufficiently accurate quantity of an item on a shelf.

The product database 225 comprises product visual descriptor (e.g. images of items taken from multiple views, size, color, texture of items, bar code on product), barcodes for items, and locations of items in the store used for comparison and analysis by the product bar decoder 210, the out-of-stock detector 215, and the product counter 220. The inventory control module 230 receives missing item flags and misplaced item flags, generating an inventory control report for employees of the stores. Using the inventory control report, employees can replace missing products from stock located in other locations of the store or from a store warehouse. Employees can further order replacement product based on the inventory control report. Employees can relocate misplaced items based on the inventory control report. In one embodiment, an inventory control report comprises indications of shelves that are in disarray in which an adequate number of items are on the shelf but the items are not properly stacked or arranged.

In one embodiment, the mobile inventory robot 20 is automated, navigating the retail store or warehouse and placing orders for items without intervention by a human. In another embodiment, the mobile inventory robot 20 is manually controlled, requiring navigation by an operator at the inventory control system 15 while the mobile inventory robot 20 is capturing images of items on shelves. The operator can move the mobile inventory robot 20 from side to side to get different views, etc. In a further embodiment, the mobile inventory robot 20 comprises a hybrid of automated control and manual control in which the mobile inventory robot 20 navigates the store and detects out-of-stock items autonomously and automatically, and requests assistance from a remote operator when exceptions are noted or an obstacle is met that the robot cannot navigate around, such as boxes, new floor displays, shopping carts and people. The operator can enter the location of the obstacle so the inventory robot can avoid the obstacle the next time the inventory robot encounters the obstacle, to reduce the number of requests for operator assistance.

Figure 3:
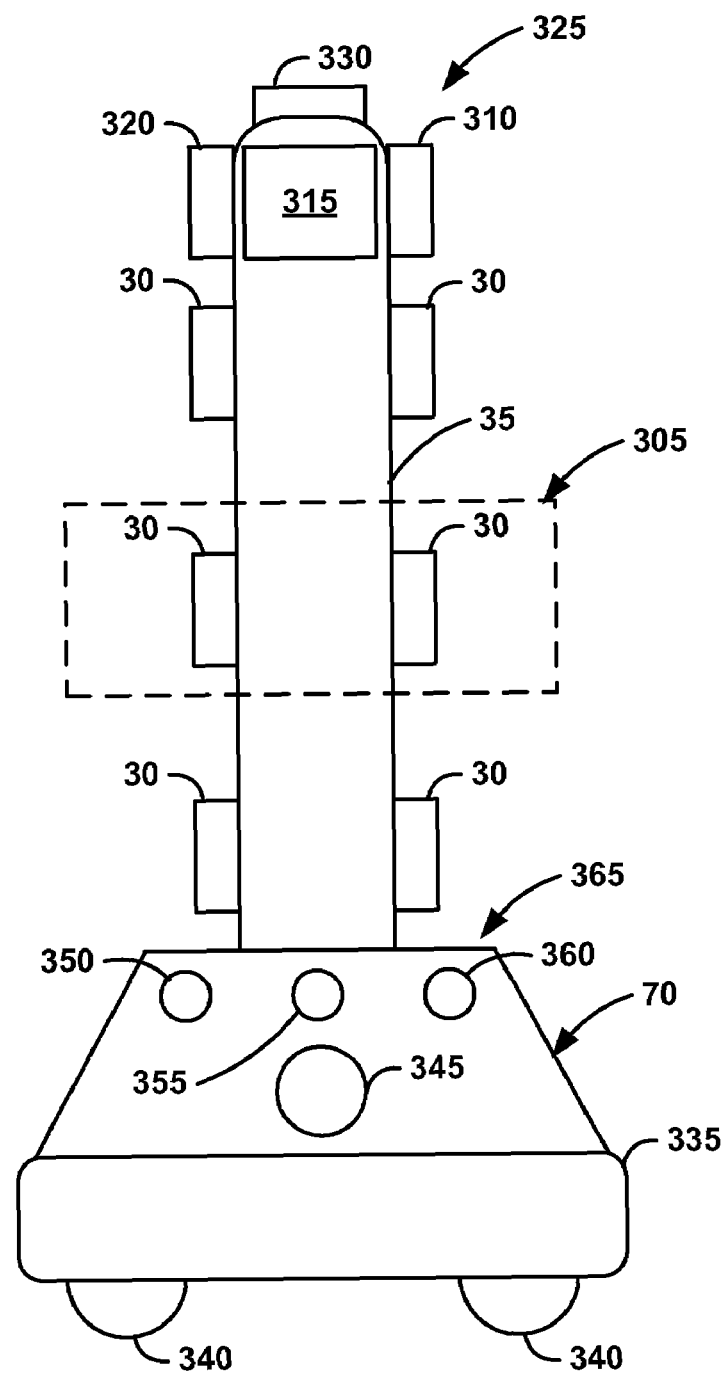
FIG. 3 is a diagram of an exemplary mobile inventory robot of the mobile inventory robot system of FIGS. 1 and 2 in which the mobile inventory robot comprises a fixed-length support for one or more imaging cameras used to image shelves in a retail store or warehouse.

FIG. 3 illustrates a diagram of one embodiment of an exemplary mobile inventory robot 20A. The mobile inventory robot 20A comprises imaging devices 30. An exemplary imaging device is, for example, a digital camera. The mobile inventory robot 20A further comprises a fixed-length imaging device positioning and support system 35. The imaging devices 30 are attached to the imaging device positioning and support system 35 at heights that allow each of the imaging devices 30 to capture images of shelves in the store. A set of imaging devices 30 such as imaging device set 305 is used for each shelf height such that in one pass, the mobile inventory robot 20A captures images of each shelf on both sides of the mobile inventory robot 20A. In one embodiment, the imaging device positioning and support system 35 comprises a flexible post covered in a soft material such as foam rubber to prevent damage to the mobile inventory robot 20A or other objects or persons in the event of a collision.

The obstruction avoidance system 60 and control system 40 utilize imaging devices 310, 315, and 320 (collectively referenced as navigation imaging devices 325) to avoid or navigate around obstacles and to provide image feedback to an employee operating the manual control system 235 to navigate the mobile inventory robot 20A. A tracking image device 330 provides tracking feedback to the control system 40 via images of tracking tags installed on the ceiling of the store. In one embodiment, each of the navigation imaging devices 325 comprises a low-resolution, high frame-rate digital camera with a wide angel lens. This low-resolution, high frame-rate digital camera has resolution and frame-rate specifications, for example, of approximately 640×480 VGA resolution and approximately a 10 Hz frame rate The mobile platform module 70 comprises a motor and the power supply system 75. The weight of the components of the mobile platform module 70 creates a low center of gravity, providing stability for the mobile inventory robot 20A. The mobile platform module 70 further comprises a bumper 335, wheels 340, a docking port 345 for charging the battery of the power supply system 70, and a detector 350, 360 (collectively referenced as detectors 365) for obstacle avoidance. In one embodiment, detectors 365 comprise ultrasonic range finders that emit and receive ultrasonic signals, allowing the mobile inventory robot 20A to detect and avoid obstacles. Detector 355 detects infrared waypoints (not shown) and helps control system 40 navigate docking port 345 to stationary power docking station (not shown).

The mobile inventory robot 20A navigates through an integration of the navigation imaging devices 325, the tracking image device 330, tracking tags installed on the ceiling of the store, detectors 365 imbedded in the mobile inventory robot 20, and dead reckoning. Tracking tags installed on the ceiling is taught in the following reference: T. Zimmerman, "Tracking Shopping Carts Using Mobile Cameras Viewing Ceiling-Mounted Retro-reflective Bar Codes," Proceedings of the Fourth IEEE International Conference on Computer Vision Systems 2006, and in co-pending U.S. patent application Ser. No. 11/325,952, filed on Jan. 5, 2006, and titled "Mobile Device Tracking", supra. The mobile inventory robot 20 further uses barcode tags installed on shelves in the retail store or warehouse for orientation within an inventory map of an inventory route and for product identification.

Figure 4:
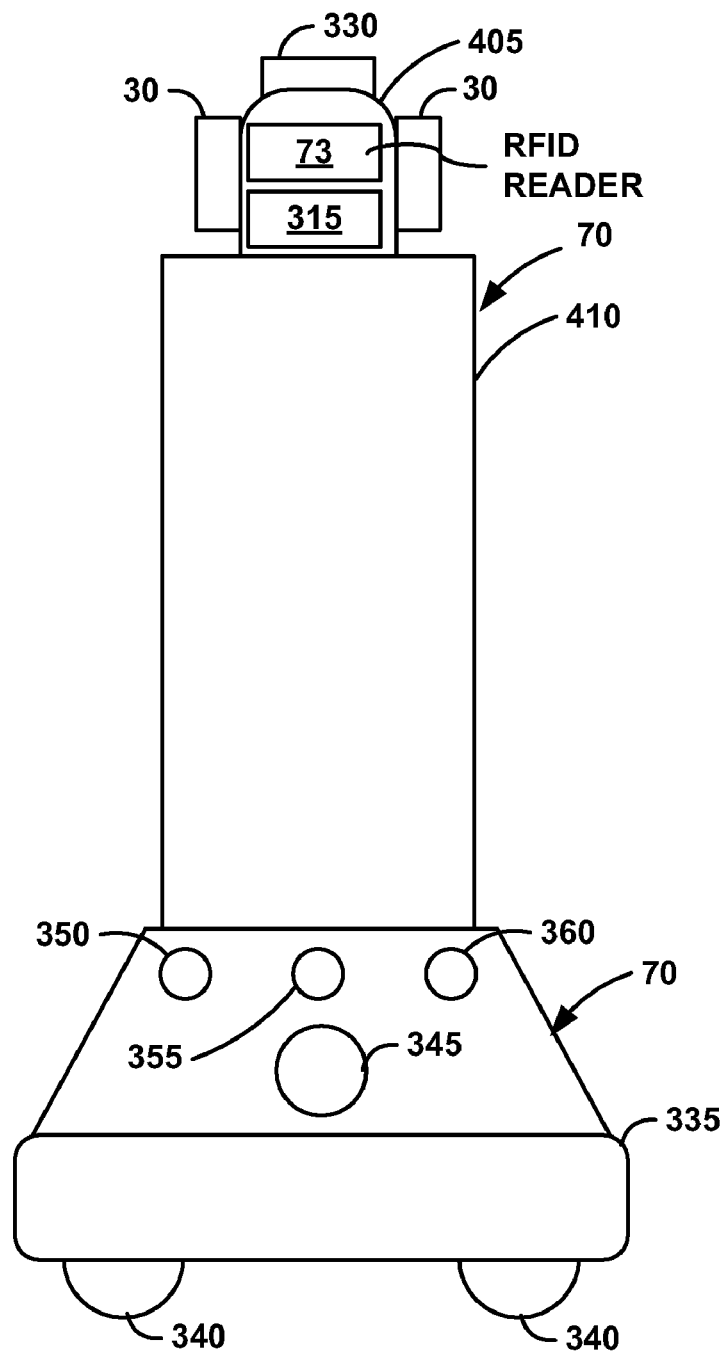
FIG. 4 is a diagram of an exemplary mobile inventory robot of the mobile inventory robot system of FIGS. 1 and 2 in which the mobile inventory robot comprises an expandable support for one or more imaging cameras used to image shelves in a retail store or warehouse.

FIG. 4 illustrates a diagram of another embodiment of an exemplary mobile inventory robot 20B comprising a flexible imaging device and positioning support system 70. The flexible imaging device and positioning support system 70 comprises a support post 405 and a flexible section 410. Imaging devices 30 and RFID reader 73 are attached to the support post 405. The flexible section 410 raises and lowers the support post 405, allowing the imaging devices 30 to image shelf bar codes, shelf items and bar codes on shelf items; and allowing the RFID reader 73 to read RFID tags of items, cartons and pallets on shelves, floor, ground or stacked upon one another. In one embodiment, the flexible section 410 comprises a bellows that expands and compresses, moving the support post 405 vertically. In another embodiment, the flexible section 410 comprises a telescoping support.

Figure 5A:
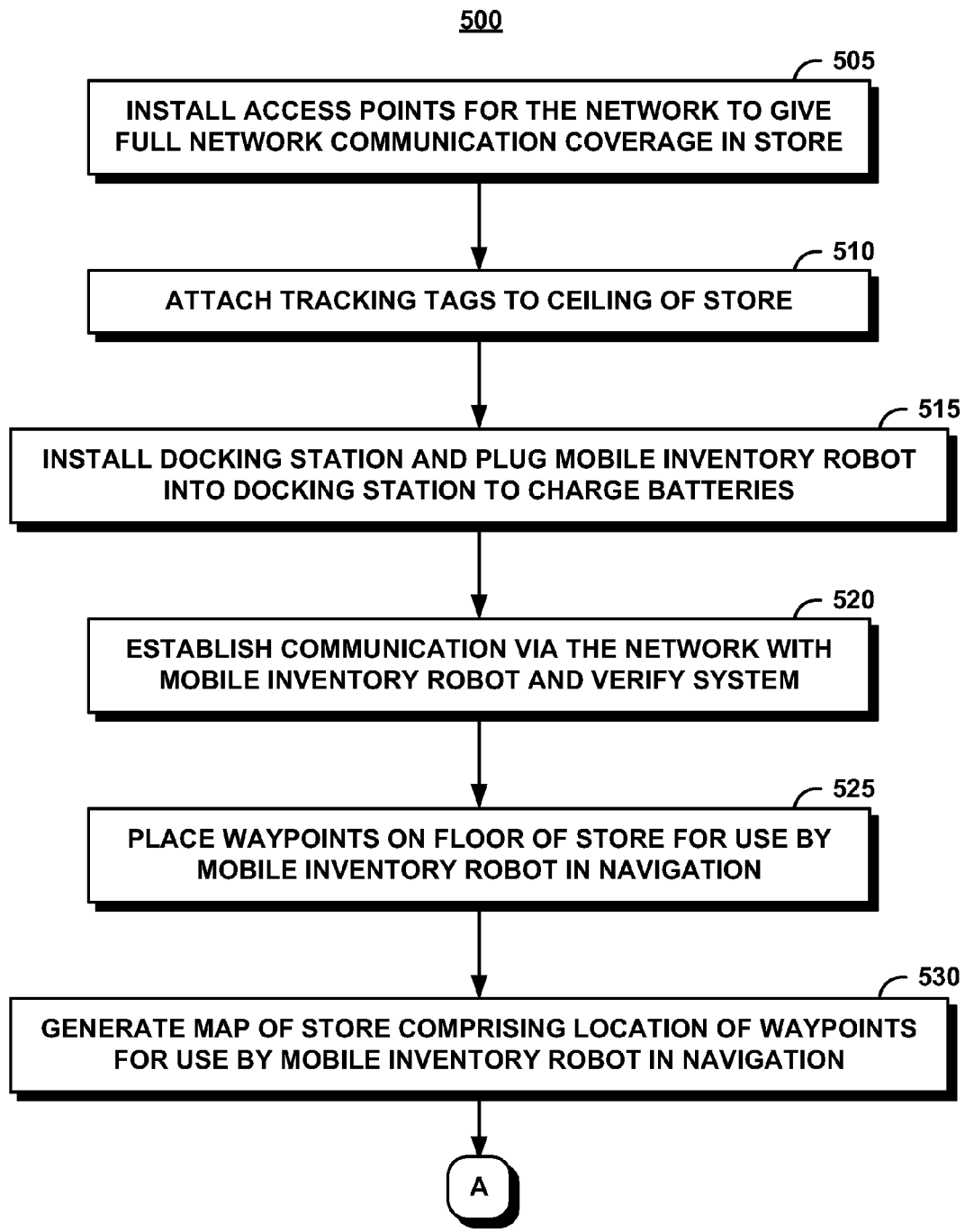
FIG. 5 is comprised of FIGS. 5A and 5B and represents a process flow chart illustrating an exemplary method of installation of the mobile inventory robot system of FIGS. 1 and 2 in a retail store or warehouse.
Figure 5B:
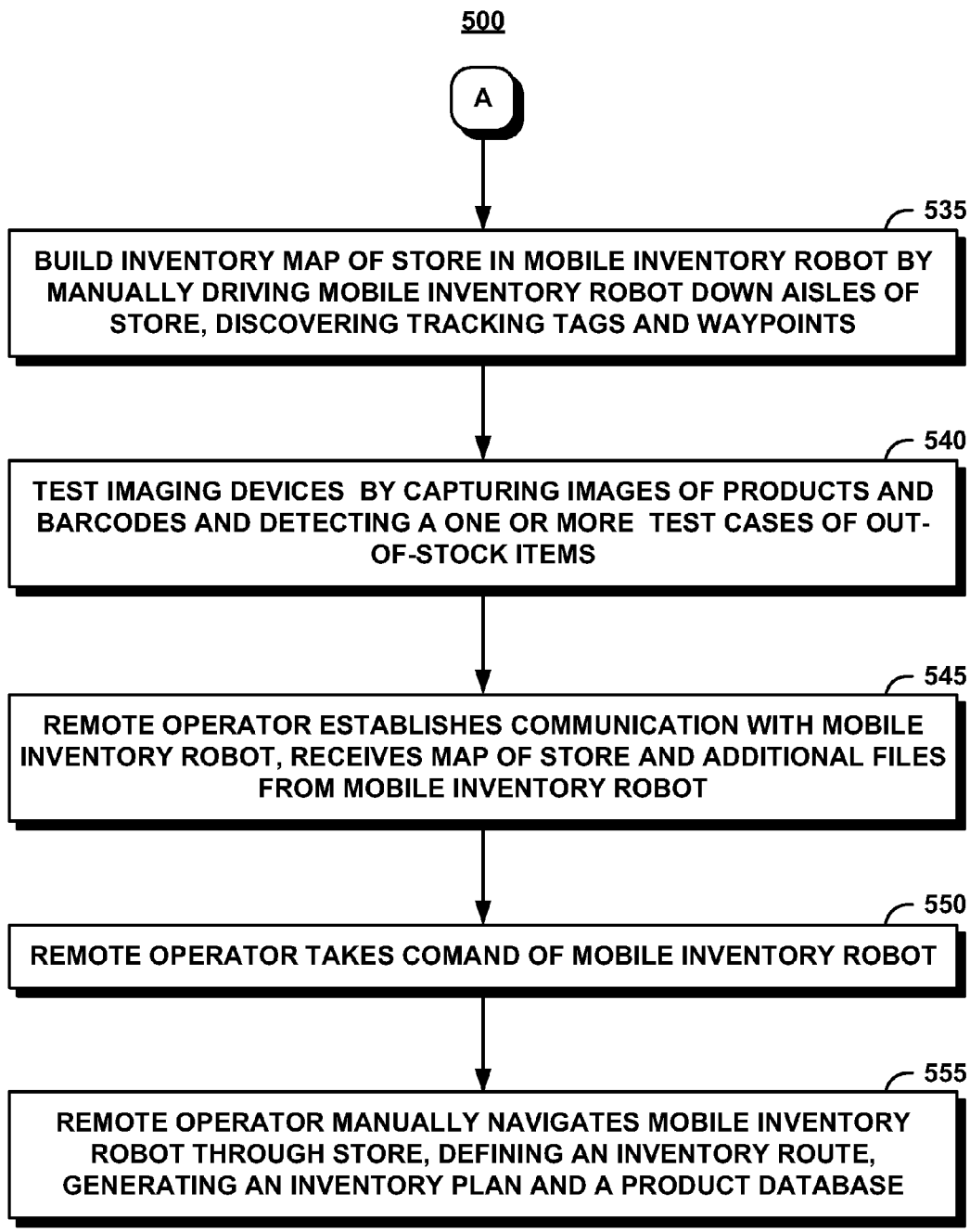

FIG. 5 (FIGS. 5A, 5B) illustrates a method 500 of installing system 10 in a retail store. An installer installs wireless access points for network 25 in the store, to create a wireless network, providing full network communication coverage for the mobile inventory robot 20 in the store (step 505). The installer attaches to the ceiling tracking tags such as, for example, retro-reflective tags (step 510). The tracking system 55 uses the tracking tags to determine location. The installer installs a docking station (not shown) for charging the battery of the power supply system 75 and plugs the mobile inventory robot 20 into the docking station (step 515). After the initial charging, the inventory robot 20 can from then on self-dock to automatically charge itself when required.

The installer establishes communication via the network 25 with the mobile inventory robot 20 and verifies system 10 (step 520). The installer places waypoints near the floor of the store for use by the tracking system 55 to navigate through the store (step 525). In one embodiment, the waypoints comprise infrared transmitters. The waypoints provide navigation vectors; detecting two provide the inventory robot an absolute position fix of its location in the store. The installer generates a map of the store in the mapping system 65 comprising locations of the infrared waypoints; the mobile inventory robot uses the map in navigation (step 530). The installer builds an accurate inventory map of the store in the mapping system 65 by manually driving the mobile inventory robot 20 down aisles of the store, discovering tracking tags and waypoints (step 535). The installer tests the imaging devices 30 by capturing images of products and barcodes and by detecting one or more cases of out-of-stock items (step 540).

A remote operator establishes communication with the mobile inventory robot 20 via the inventory control system 15 and network 25, receiving the generated inventory map of the store and additional files from the mobile inventory robot 20 (step 545). The remote operator takes command of the mobile inventory robot 20 (step 550). The remote operator manually navigates the mobile inventory robot 20 through the store, defining an inventory route, and generating an inventory plan and the product database 225 (step 555).

Figure 6:
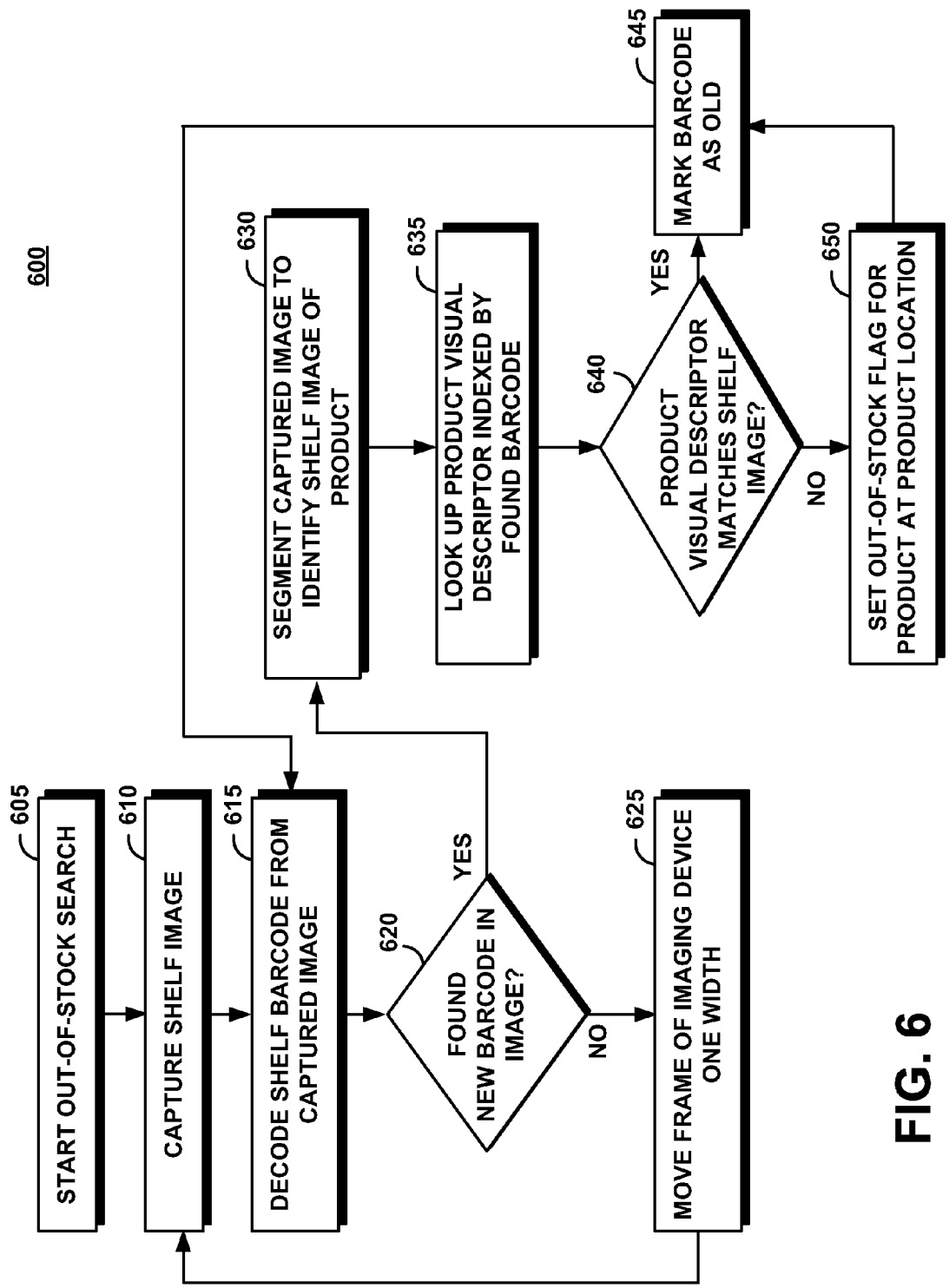
FIG. 6 is a process flow chart illustrating an exemplary method of operation of the mobile inventory robot system of FIGS. 1 and 2 in inventorying a retail store or warehouse for out-of-stock items.

FIG. 6 illustrates a method 600 of operation of system 10 in inventorying a store for out-of-stock items. System 10 starts an out-of-stock search of the retail store (step 605). The imaging device 30 captures a shelf image (step 610). The product barcode decoder 210 decodes a product barcode from the captured image (step 615). The product barcode decoder 210 determines whether the captured image comprises a barcode (decision step 620). If not, the mobile inventory robot 620 moves the frame of the imaging device one width (step 625). Processing returns to step 610.

If at decision step 620 a barcode is found in the image, the product image segmentation module 205 segments the captured image to identify a shelf image of the product (step 630). The inventory control module 230 retrieves the product visual descriptor from the product database 225, indexed by the found barcode (step 635). The out-of-stock detector 215 determines whether the product visual descriptor in the product database 225 sufficiently matches the shelf image captured by the imaging device 30 (decision step 640). If yes, the inventory control module 230 marks the found barcode as old, and processing returns to step 610 (step 645). Otherwise, the product visual descriptor does not sufficiently match the shelf image (decision step 630), and the inventory control module 230 an out-of-stock flag (step 650) for the expected product at the product location. In one embodiment, the inventory control module 230 sends an out-of-stock message to the store product ordering system (not shown). The inventory control module 230 marks the barcode as old (step 645) and processing returns to step 615. Marking barcodes old (step 645) prevents the same bar code from being processed more than once in a given image. The same barcode may appear in another image, as would happen when a product is stocked in multiple locations in the store. For those products the inventory control module 230 utilizes location information provided by the mapping system 65 (data path not shown) to disambiguate between one product that is stocked in multiple locations. In another embodiment detecting and decoding a barcode on an item, identifies the item and the items identifying characteristics, including shape and color, are placed in a product image database.

FIG. 7 (FIGS. 7A, 7B) illustrates a diagram of an exemplary shelf in a retail store that is imaged during a physical count by system 10. A shelf structure 705 comprises a shelf 1, 710, a shelf 2, 715, and a shelf 3, 720, collectively referenced as shelves 725. Each of the shelves 725 comprises a front lip on which barcode tags can be placed. For example, shelf 2, 715, comprises a front lip 730. The front lip 730 comprises barcode tags such as barcode tag 735, barcode tag 740, barcode tag 745, and barcode tag 750 (collectively referenced as barcode tags 755). Each of the barcode tags 755 comprises a barcode, an item name, and additional information about an item placed on shelf 2, 715, above the corresponding barcode tag. For example, the barcode tag 735, the barcode tag 740, the barcode tag 745, and the barcode tag 750 each comprise a barcode for a set of items 760, a set of items 765, a set of items 770, and a set of items 775, respectively.

FIG. 7B illustrates the imaging device 30 capturing an image of the set of items 770 and the barcode tag 745. Using this captured image, system 10 can segment the captured image to detect which product is in the set of items 770, decode the barcode in the barcode tag 745, match the detected product in the captured image with a stored image of the product, and verify whether the set of items 770 on shelf 2, 715, matches the barcode in the barcode tag 745.

FIG. 8 (FIGS. 8A, 8B) illustrates a diagram of an exemplary shelf in a retail store that is imaged during a physical count by system 10. The shelf 2, 715 is missing the set of items 770 shown in FIG. 7 (FIGS. 7A, 7B). FIG. 8B illustrates the imaging device 30 capturing an image of the shelf 2, 715 above the barcode tag 745. Using this captured image, system 10 can determine that the shelf 2, 715, is empty of items, decode the barcode in the barcode tag 740, and flag the item corresponding to the barcode as out-of-stock at that location on shelf 2, 715. Furthermore, system 10 can determine that one of the barcode tags 755 is missing, and flag the location of the missing barcode tag for correction by an employee. In one embodiment retro-reflecting material 810 is applied to the back wall of the shelf and a light source 820 is mounted substantially near the imaging device 30. When no items are present on the shelf, light from the light source 820 is substantially reflected by the retro-reflecting material 810 towards the imaging device 30, providing a bright easy-to-detect optical signal, indicating an out-of-stock condition.

System 10 provides a method for performing a physical count or cycle count of items in a warehouse or store that is less expensive than conventional methods using employees, external auditors, etc. System 10 provides counts of items on shelves that can be used to achieve the re-order point for each item in the store without incurring overstock conditions for the item. System 10 can further reduce shrinkage by providing accurate status of the inventory of all items within the store without introducing human error that is inherent in the conventional approach to inventory control that uses humans as inventory agents.

Figure 9A:
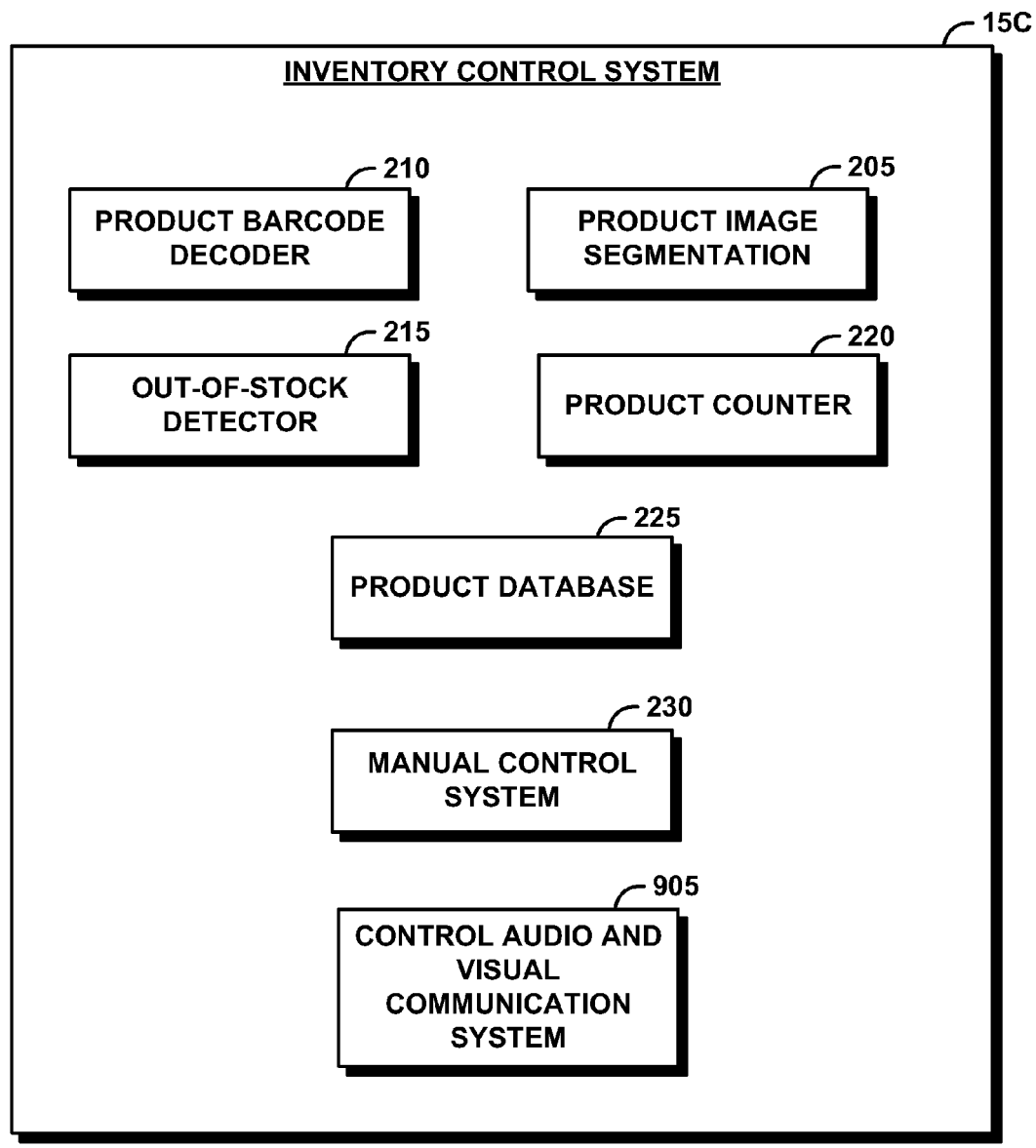
FIG. 9 is comprised of FIGS. 9A and 9B and represents a block diagram of a high-level hierarchy of one embodiment of the mobile inventory robot system of FIGS. 1 and 2 in which an audio and visual communication system is used to communicate with customers in a retail store or employees in a warehouse.
Figure 9B:
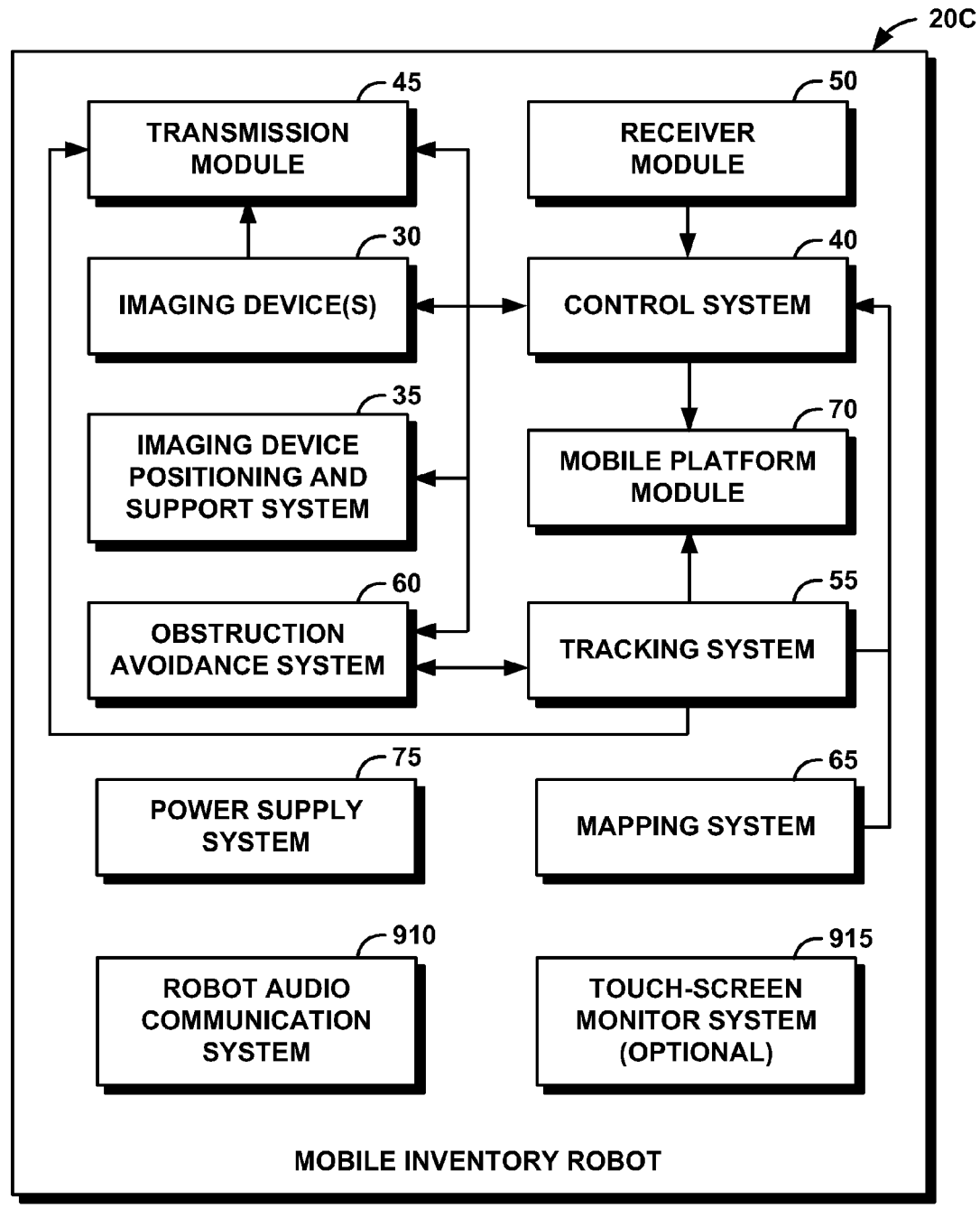

FIG. 9 (FIGS. 9A, 9B) illustrate one embodiment in which a mobile inventory robot 20C is used to communicate from a remote employee operating the inventory control system 15C to an employee or customer near the mobile inventory robot 20C. The inventory control system 15C comprises a control audio and visual communication system 905 for transmitting audio and visual to and receiving audio and visual from the mobile inventory robot 20C. The mobile inventory robot 20C comprises a robot audio communication system 910, including audio input and audio output (not shown), for transmitting audio to and receiving audio from the inventory control system 15C. In one embodiment, audio signals are transmitted using a voice over Internet protocol via network 25.

In another embodiment, the control audio communication system 905 comprises a voice recognition system that converts voice to text, converting the voice audio from the employee at the inventory control system 15C into text for transmission to the mobile inventory robot 20C. The robot audio communication system 910 converts the transmitted text into audio using voice synthesis. The synthesized voice can maintain a persona for the mobile inventory robot 20C and remove any accent from the voice of the employee at the inventory control system 15C.

The inventory robot 20C may further comprise an optional touch-screen monitor system 915. The touch-screen monitor system 915 allows the mobile inventory robot 20C to perform as a mobile customer kiosk, providing information to customers such as product location, current location of the customer, whether a product is stocked by the store, locating a store employee, and other customer and employee services and functions. The imaging devices 30 can provide the visual capture function of the control audio and visual communication system 905. The touch-screen monitor system 915 can provide the visual output function of the control audio and visual communication system 905.

System 10 can capture and sent images of shelf item layouts to remote store managers that are unable to travel the entire floor of a store daily. System 10 can further provide images of shelf item layouts to consumer goods companies to assure that the products of the consumer goods company are on the shelf and confirm product placement. Confirming product placement is especially useful for validating contracts between consumer goods companies and retailers in which consumer good companies pay a premium for product placement and promotion.

System 10 identifies and eliminates out-of-stock items by detecting empty shelves, tracks touch and buying patterns of customers by noting items touched on shelves, and provides accurate inventory visibility. System 10 develops an inventory map of which products sit on which shelf for a store and enables the map to be remotely monitored. System 10 enables the use of pay-for-performance contracts based on real shelf inventory data and merchandising effectiveness. The RFID reader 73 enables the inventory robot to detect and track the location of pallets and cartons in the backroom or warehouse, providing greater visibility of goods in the supply chain. The combination of RFID reader 73 and imaging devices 30 provides means for the inventory robot to track items from their arrival at the docks of a store or warehouse, to their stocking on shelves, and disappearance from shelves.

From the perspective of a consumer goods company or manufacturer (referenced as company or companies), system 10 enables companies to verify use of paid shelf space, adherence to merchandising sets, desired inventory levels, and a number of stores and location of stores in which a product is available. System 10 allows companies to verify in-aisle or end-cap promotional displays to know when a product was initially available and how long the promotion ran.

For volume discounts, statistics generated by system 10 allow companies to provide payments based on items placed on a shelf and sold rather than based on the number of cases shipped to a distribution center. This ensures that trade funds are used to place products in front of customers in a retail chain in locations that the companies specify.

In one embodiment, system 10 can provide an accurate count of items on a shelf. This allows a retail store to detect theft when a shelf count change is not reflected in a point-of-sale transaction log. An accurate count of items on a shelf further enables automatic inventory of a retail store at a unit level. In another embodiment, system 10 is used to inventory boxes in a warehouse or back room of a supermarket, where the boxes are labeled with bar codes, RFID tags, text printing, or combination of labels.

System 10 requires little physical and aesthetic impact on the store beyond attaching tracking tags to ceilings, waypoints on floors, and installing a docking station for charging the mobile inventory robot 20. System 10 minimizes the initial installation and calibration costs and efforts required for each store. In one embodiment, calibration and maintenance are performed remotely. Through remote adaptation, system 10 adapts to changes in layout of a store without requiring support by a specialist at each store.

Figure 10:
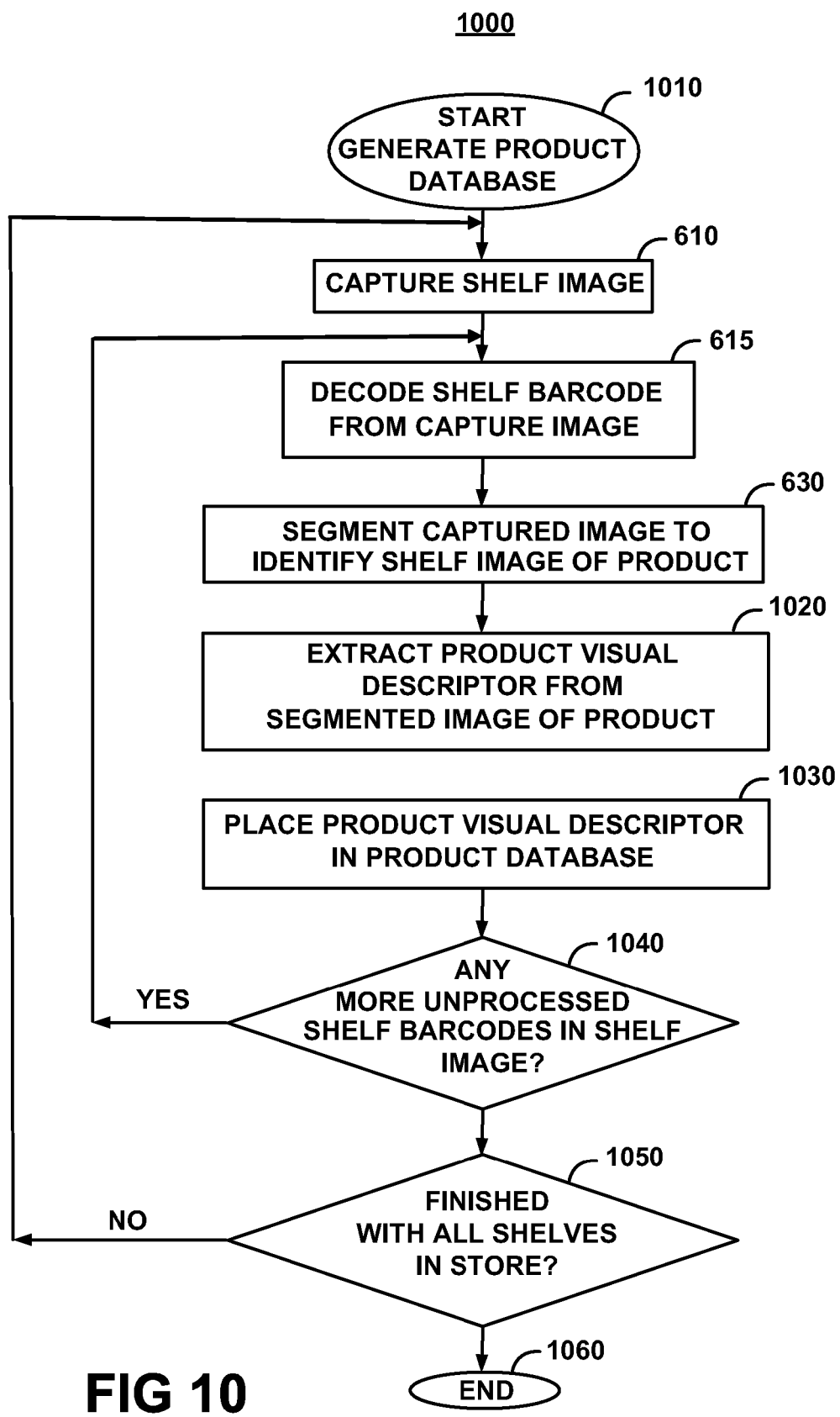
FIG. 10 is a process flow chart illustrating an exemplary method of generating a product database using the mobile inventory robot system of FIGS. 1 and 2 for inventorying a retail store or warehouse.

FIG. 10 illustrates a method 1000 of generating a product database 225, starting at step 1010. The imaging device 30 captures a shelf image (step 610). The product barcode decoder 210 decodes a product barcode from the captured image (step 615). The product image segmentation module 205 segments the captured image to identify a shelf image of the product (step 630). One or more product visual descriptors are extracted from the segmented image of the product (step 1020). The product visual descriptors are placed in the product database 225 (step 1030). If there are any more unprocessed shelf barcodes (step 1040), the unprocessed shelf barcode is decoded (step 615). If all the shelves in the store have been processed (step 1050) the generation of the product database 225 is complete (step 1060), otherwise a new shelf image is captured (step 610).

It is to be understood that the specific embodiments of the invention that have been described are merely illustrative of certain applications of the principle of the present invention. Numerous modifications may be made to the system and method for performing inventory using a mobile inventory robot described herein without departing from the spirit and scope of the present invention. Moreover, while the present invention is described for illustration purpose only in relation to products in retail stores and warehouses, it should be clear that the invention is applicable as well to, for example, any application in which items are counted or inventoried such as a library, a hospital, a school or university, a large hotel, etc. Furthermore, while the present invention is described for illustration purpose only in relation to products stored on shelves, it should be clear that the invention is applicable as well to products stored in any type of display such as, for example, items stored in bins, in stacks, on hangars, on racks, on hooks, in cages, military base, depot, dock, or other indoor or outdoor environments including dark, remote, inhospitable or dangerous environments, etc.

What is claimed is:

1. A processor-implemented method for performing inventory of products with identifiers disposed on a plurality of shelves in a store, using a mobile inventory robot, the method comprising:
    emitting ultrasonic signals from the mobile inventory robot;
    detecting a returned ultrasonic signal reflected from obstacles in the store;
    navigating the mobile inventory robot through aisles in the store and avoiding obstacles based on the detected ultrasonic signals wherein the mobile inventory robot arrives at a shelf in the store;
        wherein navigating the mobile inventory robot through the store comprises locating at least one of a plurality of retro-reflective tracking tags, and
        wherein the retro-reflective tracking tags are secured to a fixed structure of the store to assist the mobile inventory robot in determining a location of the mobile inventory robot within the store;
    capturing an image of the shelf;
    decoding a product barcode from the captured shelf image;
    segmenting the captured shelf image to detect an image of at least one of the products on the shelves;
    retrieving a product visual descriptor from the decoded product barcode;
    determining whether the detected image of the at least one of the products matches the retrieved product visual descriptor; and
    upon determination that the detected image of the at least one of the products does not match the retrieved product visual descriptor, setting an out-of-stock flag for the product corresponding to the decoded product identifier;
    determining whether the at least one of the products corresponds to the decoded product barcode; and
    generating a flag when the at least one of the products on the shelf is located in a wrong location if the at least one of the products does not correspond to the decoded product barcode for the shelf.

2. The method of claim 1, wherein navigating through the store further comprises using an inventory map of the store.

3. The method of claim 2, further comprising generating the inventory map of the store by manually tracking the mobile inventory robot through the store, in order to identify the identifiers and locations of the products on the shelves.

4. The method of claim 1, wherein retrieving the product visual descriptor from the decoded product identifier comprises generating a product database that contains a listing of: the products, the location of the products, and the identifiers of the products.

5. The method of claim 4, wherein generating the product database comprises:
    capturing an image of a shelf
    decoding the product barcode from the captured shelf image;
    segmenting the captured shelf image to detect an image of at least one of the products on the shelves;
    extracting the product visual descriptor of the products image, wherein the product visual descriptor is selected from any one or more of: a list of images, sizes, shapes, colors, bar code and textures; and
    placing the product visual descriptor in a product database.

6. The method of claim 1, wherein capturing the shelf image is performed by an imaging device.

7. The method of claim 6, further comprising a light source that is located in the vicinity of the imaging device; and
    a retro-reflecting material located against a back wall of the shelf, resulting in a reflected optical signal when no products are located on the shelf, indicating an out-of-stock condition.

8. The method of claim 6, wherein the imaging device is mounted on a flexible section capable of moving the imaging device vertically, in order to image the products on the shelves at different heights.

9. The method of claim 1, further comprising using an RFID reader to read RFID tags of objects selected from any of: a list of products, boxes, cartons, and pallets.

10. The method of claim 9, wherein the RFID reader is mounted on a flexible section capable of moving the RFID reader vertically, in order to read RFID tags located at different heights.

11. The method of claim 1, wherein the mobile inventory robot communicates via a wireless network with an inventory control system at a remote location.

12. The method of claim 1, wherein the mobile inventory robot is controlled by a remote operator.

13. The method of claim 12, wherein the mobile inventory robot comprises an audio input and an audio output to enable the remote operator to converse with a person located in proximity of the mobile inventory robot.

14. The method of claim 1, wherein the product visual descriptor is selected from any one or more of: a list of images, sizes, colors, and textures.

15. A processor-implemented system for performing inventory of products with identifiers disposed on a plurality of shelves in a store, using a mobile inventory robot, comprising:
    a tracking system, including ultrasonic range finders, for navigating the mobile inventory robot to a shelf through aisles in the store;
        wherein the tracking system navigates the mobile inventory robot through the store by locating at least one of a plurality of retro-reflective tracking tags, and
        wherein the tracking tags are secured to a fixed structure of the store to assist the mobile inventory robot in determining a location of the mobile inventory robot within the store;

an imaging device mounted on the mobile inventory robot for capturing an image of the shelf;

a decoder for decoding a product barcode from the captured shelf image;

a product image segmentation module for segmenting the captured shelf image to detect an image of at least one of the products on the shelves;

an inventory control module for retrieving a product visual descriptor from the decoded product barcode;

an out-of-stock detector for determining whether the detected image of the at least one of the products matches the retrieved product visual descriptor; and upon determination by a product visual descriptor that the detected image of the at least one of the products does not match the retrieved product visual descriptor, the inventory control module setting an out-of-stock flag for the product corresponding to the decoded product identifier, and upon determination that the at least one of the products does not match the product barcode, the inventory control module setting a misplaced item flag for at least one of the products.

16. The system of claim 15, wherein the tracking system tracks through the store using an inventory map of the store.

17. The system of claim 16, further comprising a mapping system for generating the inventory map of the store by manually navigating the mobile inventory robot through the store using a manual control system, in order to identify the identifiers and locations of the products on the shelves.

18. The system of claim 15, wherein the inventory control module retrieves the product visual descriptor from the decoded product identifier by generating a product database that contains a listing of: the products, the location of the products, and the identifiers of the products.

19. The system of claim 15, wherein the imaging device captures an image of a shelf;

the decoder decodes the product barcode from the captured shelf image;

the product image segmentation module segments the captured shelf image to detect an image of at least one of the products on the shelves;

the product visual descriptor is selected from any one or more of: a list of images, sizes, shapes, colors, bar code and textures; and a product datastore that contains the product visual descriptor.

20. The system of claim 15, further comprising a light source located in the vicinity of the imaging device; and a retro-reflecting material located against a back wall of the shelf, resulting in a reflected optical signal when no products are located on the shelf, indicating an out-of-stock condition.

21. The system of claim 15, wherein the imaging device is mounted on a flexible section capable of moving the imaging device vertically, in order to image the products on the shelves at different heights.

22. The system of claim 15, further comprising an RFID reader for reading RFID tags of objects selected from any of: a list of products, boxes, cartons, and pallets.

23. The system of claim 22, wherein the RFID reader is mounted on a flexible section capable of moving the RFID reader vertically, in order to read RFID tags located at different heights.

24. The system of claim 15, wherein the mobile inventory robot communicates via a wireless network with an inventory control system at a remote location.

25. The system of claim 15, wherein the mobile inventory robot is controlled by a remote operator.

26. The system of claim 25, wherein the mobile inventory robot comprises an audio input and an audio output to enable the remote operator to converse with a person located in proximity of the mobile inventory robot; and wherein the product visual descriptor is selected from any one or more of: a list of images, sizes, colors, and textures.

27. A computer program product that includes executable instruction codes stored on a computer readable medium, for performing inventory of products with identifiers disposed on a plurality of shelves in a store, using a mobile inventory robot, the computer program product comprising:

a set of instruction codes for navigating the mobile inventory robot around obstacles in the store using ultrasonic signals wherein the mobile inventory robot arrives at a shelf in through the store;

wherein navigating the mobile inventory robot around obstacles in the store comprises locating at least one of a plurality of retro-reflective tracking tags, and wherein the retro-reflective tracking tags are secured to a fixed structure of the store to assist the mobile inventory robot in determining a location of the mobile inventory robot within the store;

a set of instruction codes for capturing an image of the shelf;

a set of instruction codes for decoding a product barcode from the captured shelf image;

a set of instruction codes for segmenting the captured shelf image to detect an image of at least one of the products on the shelves;

a set of instruction codes for retrieving a product visual descriptor from the decoded product barcode;

a set of instruction codes for determining whether the detected image of the at least one of the products matches the retrieved product visual descriptor;

a set of instruction codes for setting an out-of-stock flag for the product corresponding to the decoded product identifier, upon determination by a product visual descriptor that the detected image of the at least one of the products does not match the retrieved product visual descriptor, and a set of instruction codes generating a flag that the at least one of the products on the shelf is located in a wrong location if the at least one of the products does not correspond to the decoded product barcode for the shelf.

* * * * *